Sept. 27, 1932.  H. E. BALSIGER  1,879,020
AUTOMATIC BY-PASS VALVE
Filed May 29, 1929
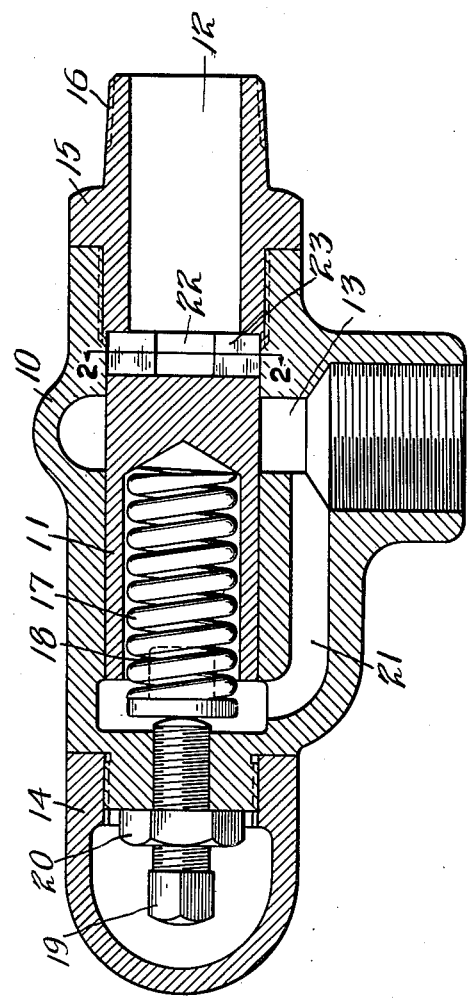
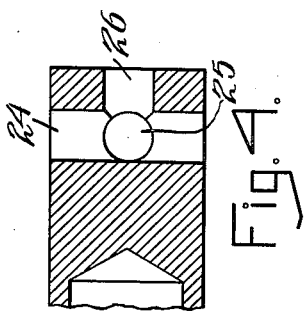
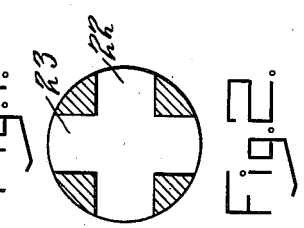
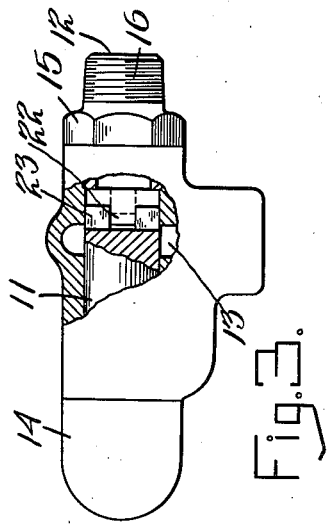
INVENTOR
Harold E. Balsiger
BY
ATTORNEY

Patented Sept. 27, 1932

1,879,020

UNITED STATES PATENT OFFICE

HAROLD EDWARD BALSIGER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA

AUTOMATIC BY-PASS VALVE

Application filed May 29, 1929. Serial No. 367,085.

This invention relates to fluid pressure relief valves, an object of the invention being to provide a relatively noiseless relief valve and one in which the elements of the valve will not get out of order while in operation.

Referring to the accompanying drawing, which is made a part hereof and on which similar reference characters indicate similar parts, Figure 1 is a sectional front elevation of the relief valve, Figure 2 is a section on line 2—2 of Fig. 1, Figure 3 is a front elevation in full, with a part in section to show the valve in open position, and Figure 4 is a longitudinal section of a portion of a modified form of piston.

The relief valves now in use usually are of the piston type, or valves which seat on a valve seat. With piston valves now in use difficulties are found due to the fact that the pressure against the ends of the piston tends to throw the piston out of line when the valve is in open position. When the piston closes its edge frequently strikes on the corner of the discharge outlet of the valve chamber and causes a hammering. When pressure relief valves are in their open position they usually must remain so against the tension of a spring which tends to close them. The result of this structure is that the valve does not remain in a steady open position, but tends to rattle or pound against the edge of the exhaust passage. The seat type of valve also tends to hammer on its seat during the escape of pressure fluid, since the supporting fluid must escape against the tension of the spring which holds the valve upon its seat. In both cases this hammering of the valve not only becomes noisy and thus objectionable, but it also causes a destructive wear upon the valve or its seat. The hammering mentioned above is due to rapid variation in pressure which in turn is very hard on pressure gages. Vibration due to hammering is detrimental both to the machine and to the work being done.

My construction overcomes these defects in that the piston never moves entirely past the exhaust passage in the valve chamber. There is no edge therefore to engage a corner of the outlet passage.

In the drawing, reference character 10 indicates a valve housing having a piston 11 slidably mounted in a chamber therein. 12 and 13 denote respectively inlet and outlet passages to the valve chamber. One end of the valve chamber has screwed thereon a cap 14. A plug 15 may be screw threaded in the other end of the valve casing, the outer end of this plug being screw threaded at 16 to receive suitable pressure line connection. Positioned in a bore within the piston 11 is a spring 17. This spring is supported by a pin 18 the enlarged end of which is engaged by a screw 19 screw threaded in the outer end of the casing 10. A lock nut 20 serves to hold the screw 19 in adjusted position. A passage 21 connects the far side of the valve chamber with the exhaust passage 13. The purpose of this is to take care of any fluid which might leak past the piston 11. The end of the piston 11 opposite the bore which contains the spring 17 contains grooves 22 and 23 cut at right angles. These grooves provide outlet channels for the fluid from the passage 12 to the outlet passage 13. It may readily be seen that when the piston has been put under pressure by fluid in the passage 12 it will be moved against the tension of the spring 17 until the passages 22 and 23 register with the outlet passage 13. The end of the piston 11 is never moved beyond the lower edge of the outlet 13. There is no opportunity therefore for the end of the piston to rest upon the edge of the outlet passage. This allows the piston to be reciprocated without injury either to the outlet passage or the piston, and moreover without the objectionable noises which frequently occur when pressure relief valves are operated.

Instead of cutting grooves 22 and 23 in the end of the piston, as shown in Fig. 1, I may modify the piston by having holes 24 and 25 bored at right angles radially through the piston and connecting the intersection of these bores by an axial bore 26. This enables me to have a longer end on the piston which becomes less liable to engage the edges of the outlet passage 13 than is true of the structure shown in Fig. 1. When the structure shown in Fig. 4 is used, the screw threads on the plug 15 are positioned further back so as to make room for the longer end on the piston. The inner end of the plug connection 15 provides a seat for the piston 11 when this piston is not under pressure sufficient to compress the spring 17. By means of the screw 19 the tension of the spring 17 may be varied so that the relief valve will operate at any predetermined maximum pressure.

It will be obvious to those skilled in the art that various changes may be made in my device without departing from the spirit of the invention, and I, therefore, do not limit myself to what is shown in the drawing and described in the specification, but only as set forth in the appended claim.

Having thus fully described my said invention, what I claim as new and desire to secure by Letters Patent, is:

A pressure relief valve comprising a casing having a relatively large chamber therein extending substantially the entire length of the casing and terminating in a small bore which extends entirely through the casing, a second bore extending radially through one wall of the casing and terminating in the said chamber, a passage connecting the said last named bore with the said chamber adjacent its inner end, a hollow plug threaded into one end of the said chamber, a screw threaded into the other end of the casing and closing the small bore, a cap threaded on the casing enclosing the said screw, a piston in the said chamber, a spring positioned between the piston and the said screw, the said spring being biased to hold the said piston seated on the inner end of the said threaded plug, the said piston having grooves cut at an angle to each other in its end to permit fluid under pressure to pass through the hollow plug and out of the radial bore when pressure exceeds a predetermined maximum, substantially as set forth.

In witness whereof, I have hereunto set my hand at Waynesboro, Pennsylvania, this 25th day of May, A. D. nineteen hundred and tweney-nine.

HAROLD EDWARD BALSIGER.